US012789076B2

(12) United States Patent
Shigeta

(10) Patent No.: US 12,789,076 B2
(45) Date of Patent: Nov. 10, 2026

(54) TABLE GAME SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 320 days.

(21) Appl. No.: 18/738,585

(22) Filed: Jun. 10, 2024

(65) Prior Publication Data

US 2024/0325870 A1 Oct. 3, 2024

Related U.S. Application Data

(63) Continuation of application No. 18/209,765, filed on Jun. 14, 2023, now abandoned, which is a (Continued)

(30) Foreign Application Priority Data

Oct. 23, 2012 (JP) ................................ 2012-246729

(51) Int. Cl.

*A63F 1/14* (2006.01)
*A63F 1/00* (2006.01)
(Continued)

(52) U.S. Cl.

CPC .................. *A63F 1/14* (2013.01); *A63F 1/12* (2013.01); *A63F 1/18* (2013.01); *G07F 17/3241* (2013.01);
(Continued)

(58) Field of Classification Search

CPC ...... A63F 1/14; A63F 1/12; A63F 1/18; A63F 2001/008; A63F 2009/242;
(Continued)

(56) References Cited

U.S. PATENT DOCUMENTS

| | | | |
|---|---|---|---|
| 4,779,401 A | 10/1988 | Pedersen | |
| 5,356,145 A | 10/1994 | Verschoor | |

(Continued)

FOREIGN PATENT DOCUMENTS

| | | | |
|---|---|---|---|
| AU | 2004203225 A1 | 2/2005 |
| AU | 2011303293 | 4/2013 |

(Continued)

OTHER PUBLICATIONS

Office Action dated Aug. 23, 2019 for CN Application 201611002121.5.

(Continued)

*Primary Examiner* — Jeffrey S Vanderveen

(74) *Attorney, Agent, or Firm* — NORTON ROSE FULBRIGHT US LLP

(57) ABSTRACT

A table game system is provided capable of identifying shuffled playing cards used at the time of the occurrence of a problem in a card shoe apparatus, thereby enabling an investigation of the cause thereof or the taking of countermeasures therefor. A card shoe apparatus of the table game system of the present invention includes a barcode reader and RFID that reads a barcode or RFID provided in a shuffled playing card set, thereby reading a shuffled card ID that uniquely identifies the shuffled playing card set. The control unit has further a function of identifying an exposition of the cut card by the card reading unit and memorizing this information as that the shuffled playing card set now being used will have or be changed to the new one. The information of the exposition of the cut card is at least used for identifying an end of the current game using the shuffled playing cards set is currently set in the card shoe apparatus. A control unit further includes a function of identifying specified events that occur during the use of set of the shuffled playing cards at a game table, and of reporting these occurrences of the specified event in connection with a shuffled card ID.

10 Claims, 8 Drawing Sheets

Related U.S. Application Data continuation of application No. 17/381,616, filed on Jul. 21, 2021, now Pat. No. 11,731,033, which is a continuation of application No. 16/678,717, filed on Nov. 8, 2019, now Pat. No. 11,103,768, which is a continuation of application No. 14/438,211, filed as application No. PCT/JP2013/004812 on Aug. 9, 2013, now Pat. No. 10,500,477.

(51) Int. Cl.

| | |
|---|---|
| *A63F 1/12* | (2006.01) |
| *A63F 1/18* | (2006.01) |
| *A63F 9/24* | (2006.01) |
| *G07F 17/32* | (2006.01) |

(52) U.S. Cl.
CPC ... *A63F 2001/008* (2013.01); *A63F 2009/242* (2013.01); *A63F 2009/2439* (2013.01); *A63F 2250/58* (2013.01); *G07F 17/3293* (2013.01)

(58) Field of Classification Search
CPC .......... A63F 2009/2439; A63F 2250/58; A63F 1/02; A63F 1/06; A63F 1/062; A63F 2001/001; A63F 2001/003; A63F 2001/005; A63F 2009/2444; A63F 2009/2447; A63F 2009/2457; G07F 17/3241; G07F 17/3293
See application file for complete search history.

(56) References Cited

U.S. PATENT DOCUMENTS

| | | | | |
|---|---|---|---|---|
| 5,374,061 | A | 12/1994 | Albrecht | |
| 6,886,829 | B2 | 5/2005 | Hessing et al. | |
| 7,407,438 | B2 | 8/2008 | Schubert et al. | |
| 7,556,197 | B2 | 7/2009 | Yoshida et al. | |
| 8,033,548 | B2 | 10/2011 | Shigeta | |
| 8,308,163 | B2 | 11/2012 | Shigeta | |
| 8,408,550 | B2 | 4/2013 | Walker | |
| 8,534,671 | B2 | 9/2013 | Nicely | |
| 8,544,847 | B2 | 10/2013 | Emori | |
| 8,556,262 | B2 | 10/2013 | Shigeta | |
| 8,591,989 | B2 | 11/2013 | Chou et al. | |
| 8,899,588 | B2 | 12/2014 | Shigeta | |
| 8,919,777 | B2 | 12/2014 | Shigeta | |
| 8,998,210 | B2 | 4/2015 | Shigeta | |
| 9,126,104 | B2 | 9/2015 | Shigeta | |
| 9,474,958 | B2 | 10/2016 | Shigeta | |
| 10,112,105 | B2 | 10/2018 | Shigeta | |
| 10,130,867 | B2 | 11/2018 | Shigeta | |
| 10,556,171 | B2 | 2/2020 | Shigeta | |
| 10,722,780 | B2 | 7/2020 | Shigeta | |
| 11,033,803 | B2 | 6/2021 | Shigeta | |
| 11,938,395 | B2 | 3/2024 | Shigeta | |
| 2002/0068635 | A1* | 6/2002 | Hill | A63F 1/14 463/47 |
| 2003/0054887 | A1 | 3/2003 | Dettrey et al. | |
| 2003/0064775 | A1 | 4/2003 | Fujimoto | |
| 2004/0026636 | A1 | 2/2004 | Shigeta | |
| 2005/0026683 | A1 | 2/2005 | Fujimoto | |
| 2005/0082750 | A1 | 4/2005 | Grauzer et al. | |
| 2006/0063577 | A1 | 3/2006 | Downs, III et al. | |
| 2006/0157932 | A1 | 7/2006 | Latell | |
| 2006/0247036 | A1 | 11/2006 | Shigeta | |
| 2007/0004499 | A1 | 1/2007 | Gioia | |
| 2007/0024449 | A1 | 2/2007 | Bilyeu et al. | |
| 2007/0049368 | A1 | 3/2007 | Juhn et al. | |
| 2007/0216092 | A1 | 9/2007 | Fleckenstein | |
| 2008/0006997 | A1 | 1/2008 | Tsai et al. | |
| 2008/0085769 | A1 | 4/2008 | Lutnick et al. | |
| 2008/0143048 | A1 | 6/2008 | Shigeta | |
| 2008/0224394 | A1 | 9/2008 | Shigeta | |
| 2009/0140492 | A1 | 6/2009 | Yoseloff | |
| 2009/0186676 | A1 | 7/2009 | Amaitis et al. | |
| 2009/0224476 | A1* | 9/2009 | Grauzer | A63F 1/14 463/47 |
| 2010/0038849 | A1 | 2/2010 | Scheper et al. | |
| 2010/0213667 | A1 | 8/2010 | Grauzer et al. | |
| 2010/0222140 | A1 | 9/2010 | Dewaal | |
| 2010/0273547 | A1 | 10/2010 | Stasi et al. | |
| 2010/0314834 | A1 | 12/2010 | Shigeta | |
| 2010/0327525 | A1 | 12/2010 | Shigeta | |
| 2011/0127722 | A1 | 6/2011 | Emori et al. | |
| 2011/0130185 | A1* | 6/2011 | Walker | G07F 17/3202 463/13 |
| 2012/0146285 | A1 | 6/2012 | Grauzer et al. | |
| 2013/0170429 | A1 | 7/2013 | Yamamoto et al. | |
| 2013/0303277 | A1 | 11/2013 | Shigeta | |
| 2015/0258420 | A1 | 9/2015 | Shigeta | |
| 2015/0290527 | A1 | 10/2015 | Shigeta | |
| 2017/0024449 | A1 | 1/2017 | Wesley, Sr. et al. | |
| 2018/0333635 | A1 | 11/2018 | Shigeta | |

FOREIGN PATENT DOCUMENTS

| | | | |
|---|---|---|---|
| CN | 1498126 | | 5/2004 |
| CN | 1830511 | | 9/2006 |
| CN | 1933881 | A | 3/2007 |
| CN | 101437586 | A | 5/2009 |
| CN | 201263881 | Y | 7/2009 |
| CN | 101500665 | Y | 8/2009 |
| CN | 101541388 | A | 9/2009 |
| CN | 101584934 | A1 | 11/2009 |
| CN | 201389327 | Y | 1/2010 |
| CN | 101804251 | A | 8/2010 |
| CN | 101884840 | A | 11/2010 |
| CN | 101959563 | A | 1/2011 |
| CN | 102186542 | A | 9/2011 |
| CN | 102307633 | | 1/2012 |
| CN | 102376184 | A | 3/2012 |
| CN | 102413884 | A | 4/2012 |
| CN | 103768786 | | 5/2014 |
| CN | 103768786 | B | 12/2016 |
| EP | 1316341 | A1 | 4/2003 |
| EP | 1335783 | A1 | 8/2003 |
| EP | 2228106 | A1 | 9/2010 |
| JP | 2003070956 | A | 3/2003 |
| JP | 2004215806 | A | 8/2004 |
| JP | 2004299878 | A | 10/2004 |
| JP | 2005046621 | A | 2/2005 |
| JP | 2005296634 | A | 10/2005 |
| JP | 2006526425 | A | 11/2006 |
| JP | 2008029865 | A | 2/2008 |
| JP | 2008081238 | A | 4/2008 |
| JP | 2008188471 | A | 8/2008 |
| JP | 2009165835 | A | 7/2009 |
| JP | 2011024603 | A | 2/2011 |
| JP | 2011115266 | A | 6/2011 |
| JP | 2012061023 | A | 3/2012 |
| JP | 2014083414 | A | 5/2014 |
| KR | 1020070030151 | A | 3/2007 |
| KR | 1020100109548 | | 10/2010 |
| WO | 2004108238 | A1 | 12/2004 |
| WO | 2006076468 | A | 7/2006 |
| WO | 2009069708 | | 6/2009 |
| WO | 2009110232 | A1 | 9/2009 |
| WO | 2009126780 | | 10/2009 |
| WO | 2012035715 | A1 | 3/2012 |
| WO | 2012035742 | | 3/2012 |
| WO | 2014064868 | | 5/2014 |

OTHER PUBLICATIONS

Japanese Office Action on JP Patent Application 2018-226431 dated Oct. 8, 2019.
Further Examination Report on New Zealand Patent Application 731436 dated Aug. 2, 2018.
Office Action on U.S. Appl. No. 16/160,617 dated Feb. 8, 2019.
Further Examination Report 011 New Zealand Patent Application 731745 dated Jul. 24, 2018.

(56) References Cited

OTHER PUBLICATIONS

Further Examination Report dated Apr. 10, 2018 for New Zealand Application No. 731436.
Office Action dated Jun. 26, 2018 for Japanese Application No. 2018-029537.
Office Action dated Sep. 8, 2017 for New Zealand Application 731436.
Chinese Office Action with partial English translation, Chinese Patent Application No. 201380055318.3, issued May 3, 2017.
Non-final Office Action, U.S. Appl. No. 14/438,178, mailed Mar. 9, 2017.
Korean Office Action, Korean Patent Application No. 10-2015-7010528, dated Nov. 25, 2016 (with partial English translation).
International Search Report, International Application No. PCT/JP2013/004215, mailed Oct. 2, 2013.
Chinese Office Action with partial English translation, Chinese Patent Application No. 201380055330.4, issued Dec. 1, 2016.
New Zealand Further Examination Report, NZ Application No. 707157, issued Jan. 12, 2017.
Non-final Office Action, U.S. Appl. No. 14/438,178, mailed Jul. 26, 2016.
Japanese Office Action, Japanese Application No. 2012246729, issued Jun. 14, 2016.
Chinese Patent Application No. 201310213631.7, Office Action and Search Report mailed Jan. 27, 2016.
Australian Patent Application No. 2013203298, Patent Examination Report No. 1 mailed Feb. 6, 2015.
Macau Patent Application No. 1/001210, Examination Report mailed Dec. 17, 2014.
International Application No. PCT/JP2013/004812, Written Opinion and International Search Report mailed Oct. 2, 2013.
Non-final Office Action, U.S. Appl. No. 14/438,211, mailed Dec. 27, 2018.
Office Action dated Apr. 3, 2020 for corresponding/family CN Application 201710843148.5.
Office Action dated Sep. 4, 2020 for corresponding/family U.S. Appl. No. 16/898,688.
Chinese Office Action on CN Patent Application 201810597960.9 dated Feb. 1, 2021.
Malaysian Notice of Grant on MY Patent Application PI2017001896 received on May 3, 2021 (dated Jan. 15, 2021).
Japanese Office Action issued on Jun. 28, 2022 for JP Patent Application 2021-174289.
Australian Examination Report No. 2 issued on Dec. 6, 2021 for AU Patent Application 2019279960.
Office Action dated Sep. 20, 2023 for U.S. Appl. No. 17/197,392.
US Office Action dated Aug. 23, 2024 issued in U.S. Appl. No. 18/426,870.

* cited by examiner

TABLE GAME SYSTEM

CROSS REFERENCE TO RELATED APPLICATION

This application is a continuation of U.S. patent application Ser. No. 18/209,765 filed Jun. 14, 2023, which is a continuation of U.S. patent application Ser. No. 17/381,616 filed Jul. 21, 2021 (now U.S. Pat. No. 11,731,033 issued Aug. 22, 2023), which is a continuation of U.S. patent application Ser. No. 16/678,717 filed Nov. 18, 2019 (now U.S. Pat. No. 11,103,768 issued Aug. 31, 2021), which is a continuation of U.S. patent application Ser. No. 14/438,211 filed Apr. 23, 2015 (now U.S. Pat. No. 10,500,477 issued Dec. 10, 2019), which is a national phase application under 35 USC § 371 of Int'l Pat. App. No. PCT/JP2013/004812 filed Aug. 9, 2013, which claims the benefit of priority to JP Pat. App. 2012-246729 filed Oct. 23, 2012. The entire contents of each application are incorporated herein by reference.

TECHNICAL FIELD

The present invention relates to a table game system with a security function in a card game such as baccarat using shuffled playing cards (hereinafter simply referred to as "cards") and also relates to a method for administrating operations of operator "a dealer" of games using cards and game tables in casino.

BACKGROUND ART

In poker, baccarat, bridge, blackjack, and other card games, a dealer sets a package of cards comprising several decks of playing cards in a card shoe or the like, and deals cards on the table by drawing them one by one.

In so doing, to ensure the fairness of the games, the cards need to be dealt at random. Therefore, a game host must sufficiently shuffle the playing cards randomly to ensure a random order of arrangement of the playing cards before they are set in the card shoe.

A conventional card shuffling device for shuffling cards is disclosed in, for example, International Publication WO 2009/069708. Each package of shuffled playing cards is provided after being shuffled with a shuffling apparatus to be arranged in a unique order with a uniquely identifiable shuffled card ID affixed on its packing box or the like as a barcode.

SUMMARY OF INVENTION

A cut card is used to prevent any player from counting the ranks of the cards dealt during a game to predict the ranks of the cards when the number of cards not yet dealt becomes small. Usually, the cut card is inserted into the shuffled playing cards before the beginning of the first game, and the cards are dealt onto the game table one by one by the dealer or the like. When the cut card is drawn from the card shoe apparatus, the card set that is currently being used is no longer used immediate after the game of few games later and will be replaced by the dealer or the operator to a new set of shuffled playing cards. This makes it impossible to identify the shuffled playing card currently being used at each game table since the replacement of the shuffled playing cards with a new one manually. For this reason, in case of any problem with the card shoe apparatus or the shuffled playing cards, it is difficult to identify the shuffled playing cards in use at the timing when the problem happened thereof, which is a problem because the casino is not able to investigate the cause of the problems.

The present invention has been made in view of the above problem, and aims to provide a table game system that is capable of identifying the shuffled playing card set that is currently being used at a game table, and also capable of, if any problem occurs with a card shoe apparatus or with cards is found, identifying the shuffled playing card set that has been used at the time of the occurrence thereof, thereby enabling an investigation of the cause whether or not there is a human (a dealer etc.) error or cards error thereof etc.

To solve the above conventional problems, the present invention provides a table game system including: shuffled playing cards composed of playing cards made up of a plurality of number of decks shuffled to have a unique arrangement order and a cut card, and a card shoe apparatus that houses the shuffled playing cards and the cut card such that the housed shuffled playing cards and the cut card are manually dealt one by one onto a game table, the card shoe apparatus comprising: a card housing unit for housing the shuffled playing cards; an opening for drawing cards from the card housing unit one by one; a card reading unit that reads from a card and from the cut card information contained in the said card; a control unit that stores rules of a card game and includes a winner/loser determination unit that determines the winner/loser of the card game based on the information on the ranks of the cards read by the card reading unit; and a display unit that outputs a result of the winner/loser determined by the winner/loser determination unit, the control unit has a function of identifying specified events that occur during the use of the identified shuffled playing cards at a game table, and of reporting these occurrences of the specified event, the control unit has further function of identifying an exposition of the cut card and of sending information of the exposition of the cut card, the information of the exposition of the cut card is at least used for identifying an end of the current games and the end the use of the shuffled playing cards currently set in the card shoe apparatus, and the specified events include at least one of the following: (1) a reading error in the card reading unit of a card, (2) an attempt to draw a card when no card should be drawn according to the rules of the card game; (3) the winner/loser of each card game during the use of the shuffled playing cards currently set in the card shoe apparatus, and, (4) an improper shuffling of a set of shuffled playing cards set in the card shoe apparatus comprising the relative arrangement of predetermined number of cards; and wherein, the information of the exposition of the cut card is used for administrating at least one of the followings; (1) an average time for one game during the use of the shuffled playing cards currently set in the card shoe apparatus, (2) an average error occurrences during the use of the shuffled playing cards currently set in the card shoe apparatus, (3) monitoring of tendencies of the results of games during the use of the shuffled, and (4) restart or reset of a monitor for displaying results of games during the use of the playing cards currently set in the card shoe apparatus.

With the present invention, it is possible to provide a table game system that is capable of, if any problem occurs with a card shoe apparatus or cards, identifying the shuffled playing cards that is being used at the time of the occurrence thereof, and thereby enables the investigation of the cause thereof or the taking of countermeasures therefor by identifying the shuffled playing cards being used or operators etc. of the games at the time of occurrence thereof.

DESCRIPTION OF EMBODIMENTS

Figure 1:
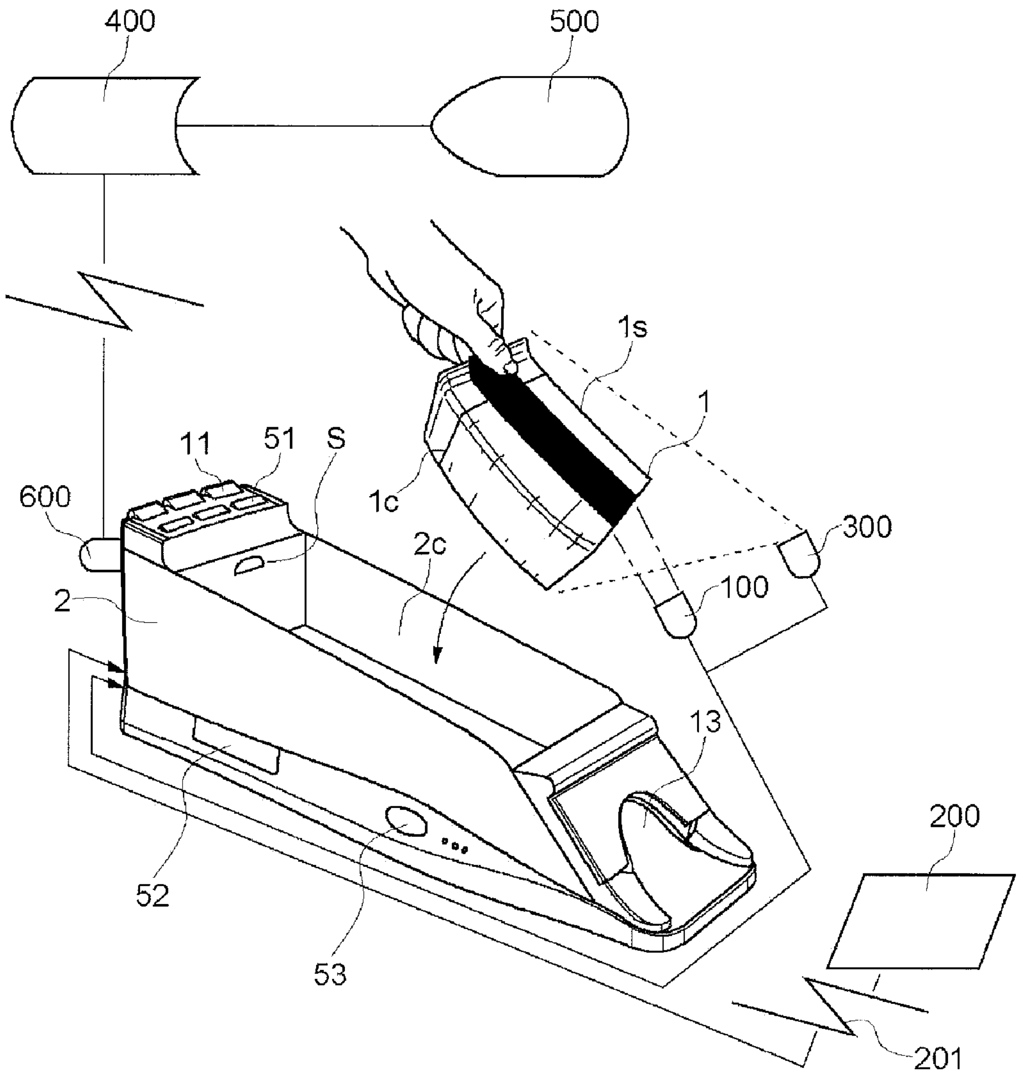
FIG. 1 is a perspective view schematically showing the entirety of a table game system according to an embodiment of the present invention.
Figure 2:
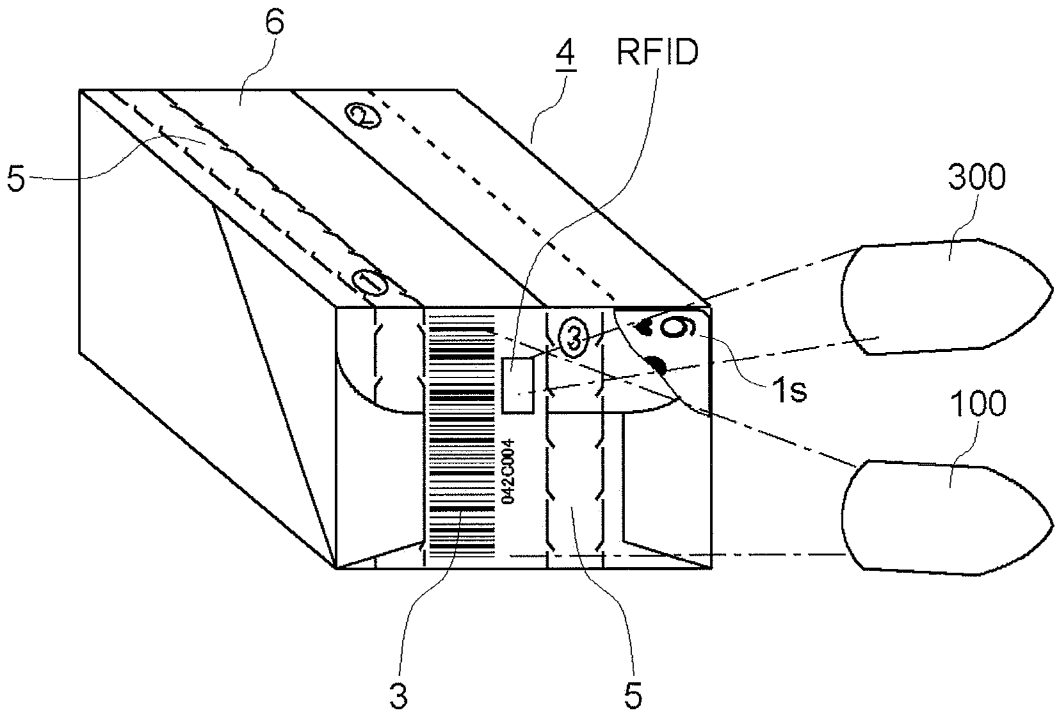
FIG. 2 is a perspective view of shuffled playing cards to be used in the table game system according to the embodiment of the present invention.

An embodiment of a table game system of the present invention will be described below. FIG. 1 is a perspective view schematically showing the entirety of a table game system according to an embodiment of the present invention. FIG. 2 is a perspective view of a package of shuffled playing cards to be used in the table game system according to the embodiment of the present invention. The shuffled playing cards used in various card games such as poker, baccarat, bridge or blackjack will ordinarily include 8 to 10 (eight to ten) decks of cards.

Although a shuffled playing card set is packed in the table game system of the present embodiment, when the shuffled playing card set is to be used in the game, it is housed in a card shoe apparatus 2 after the packing is undone to enable the cards 1 of the shuffled playing card set is to be dealt one by one. During the game, the dealer deals the cards 1 from the card shoe apparatus 2 onto the game table. The cards 1 of each shuffled playing card set 1*s*, which made up of a predetermined number of decks (normally, 6, 8, 9 or 10 decks), are shuffled to be arranged in a unique and random arrangement order, and packed with a uniquely identifiable shuffled card ID attached to a packing box 4 as a barcode 3 (RFID or RF-tag can be used instead) as an ID code.

Figure 7:
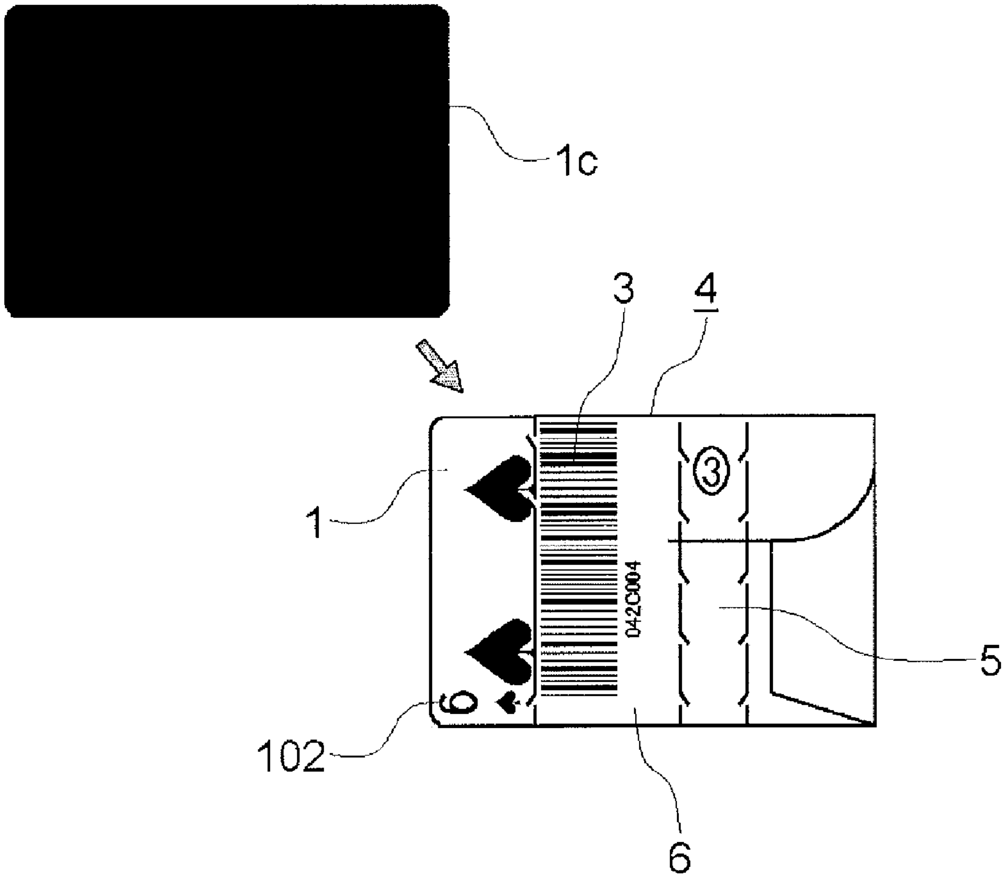
FIG. 7 shows a cut card being inserted into a package of shuffled playing cards according to an exemplary embodiment of the present invention.

In an assembled state, a packing box 4 of the shuffled playing card set is has the shape of a rectangular parallelepiped, encasing the shuffled playing card set is as shown in FIG. 2. The packing box 4 has zippers 5 provided in two locations (may at least one) a predetermined interval, each of which has zipper-shaped cut lines arranged in parallel to a longitudinal direction of the rectangular parallelepiped shape, and has a central band 6 in the central portion defined by the zippers 5 provided in the two locations. A configuration is achieved in which by removing the two zippers 5 (or at least one) along the cut lines, the left and right side faces of the packing box 4 are removed such that the side faces of the shuffled playing card set 1*s* would be exposed (FIG. 7). Circled numbers 1 to 3 indicating the procedural order for removing the zippers 5 are printed on each of the zippers 5, as shown in FIG. 2.

In accordance with this order, the portion on the left of a zipper 5 is removed first to remove the left side face of the packing box 4, thereby exposing one side edge of each of the shuffled playing cards 1 within the packing box 2 (a first side edge exposure step). This first side edge exposure step may further include a card cut step of inserting a cut card 1*c*, which is used at a casino in order to stop the use of the shuffled playing cards set 1*s* in the middle of games after that game as appropriate, into the shuffled playing cards set 1*s*. The card cut step of inserting a cut card 1*c* into the shuffled playing cards set is allows for: 1) dividing of the shuffled playing cards set is into two parts by the cut card 1*c* (the first half and second half) and then 2) exchanging positions of the two halves (the first half should be the backward position to the cut card and the second half should be in front position). This step is so called normally the "cut" in a card game. After the first "cut", the cut card 1*c* may again be inserted into the shuffled playing cards set is at casinos (see FIG. 7) in order to stop the use of the shuffled playing cards set is going forward or after a few games after the cut card 1*c* appears during dealings of the cards.

The cut card 1*c* is inserted in the shuffled playing card set is before it is set in the card shoe apparatus 2. The cut card 1*c* is inserted at any place within the latter half portion of the shuffled playing card set is when used in a game (in the last quarter or one-fifth of the shuffled playing card set 1*s*). The cut card 1*c* is used to end a game at the game table leaving about 20 to 40 cards 1 in the card shoe apparatus 2 to prevent any player counting the ranks of the cards 1 dealt during a game to predict the ranks of the cards when the number of cards not yet dealt becomes small. Normally, when the cut card is drawn during games, use of the shuffled playing card set is currently in use is stopped after that game or a few games thereafter, and the game ends. The shuffled playing card set is in the card shoe apparatus 2 is replaced with a new set, and a new game begins.

Figure 4A:
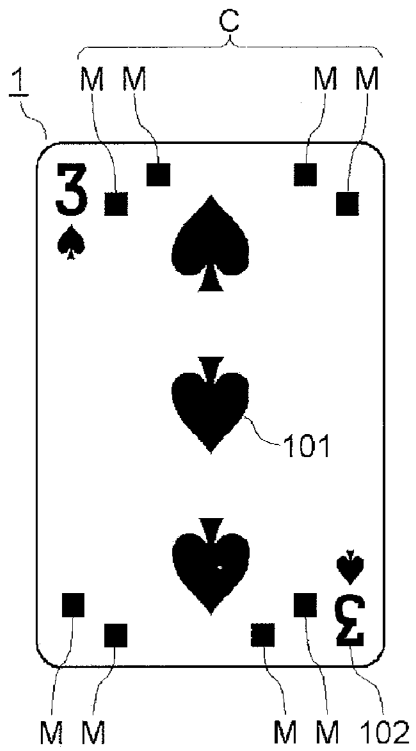
FIG. 4A is a plan view of a card according to the embodiment of the present invention.
Figure 4B:
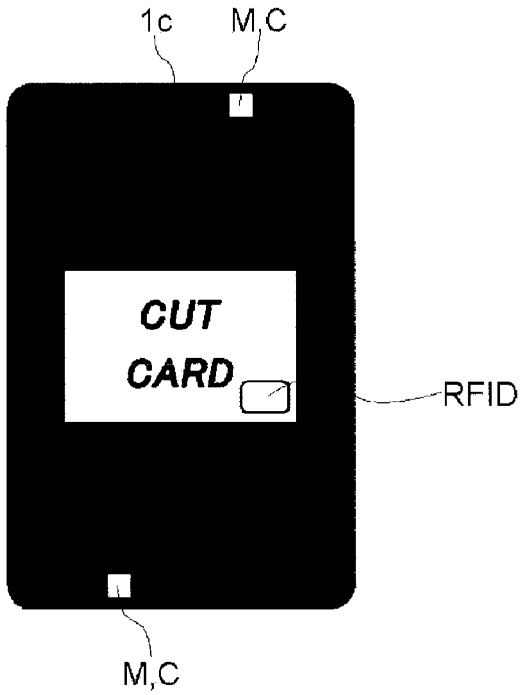
FIG. 4B is a plan view of a cut card according to the embodiment of the present invention.

As shown in FIG. 4B, an RFID (or a RF-tag) may be attached as the ID code to the cut card 1*c* instead of attaching an RFID (or a RF-tag) to the packing box 4. In this case, the cut card 1*c* may be inserted into the shuffled playing cards set is when they are packaged in a factory. This is advantageous in that it obviates the need for casinos to prepare the cut card 1*c* for the "cut." The cut card 1*c* is inserted at the left side or right side of the shuffled playing cards set is in the packing box 4, and the player (customer) or dealer of the casino may easily find and pick the cut card 1*c* in the packing box 4. In this case the RFID (or a RF-tag) may not be attached to the packing box 4, but the ID code may still be easily read from the RFID of the cut card 1*c* and the ID code uniquely identifies each set is of shuffled playing cards.

In FIG. 1, the table game system of the present embodiment includes the shuffled playing card set is composed of cards 1 made up of a predetermined number of decks shuffled to have a unique arrangement order, and which has a uniquely identifiable shuffled card ID attached as a barcode 3, or the RFID of the cut card 1*c* and a card shoe apparatus 2 for housing the shuffled playing card set is therein to allow the manual dealing of the housed cards 1 one by one onto the game table, and which has a barcode reader 100, an input means 200 or RFID reading device 300 capable of identifying the shuffled card ID for each shuffled playing card set is when it is used on the game table.

Figure 3:
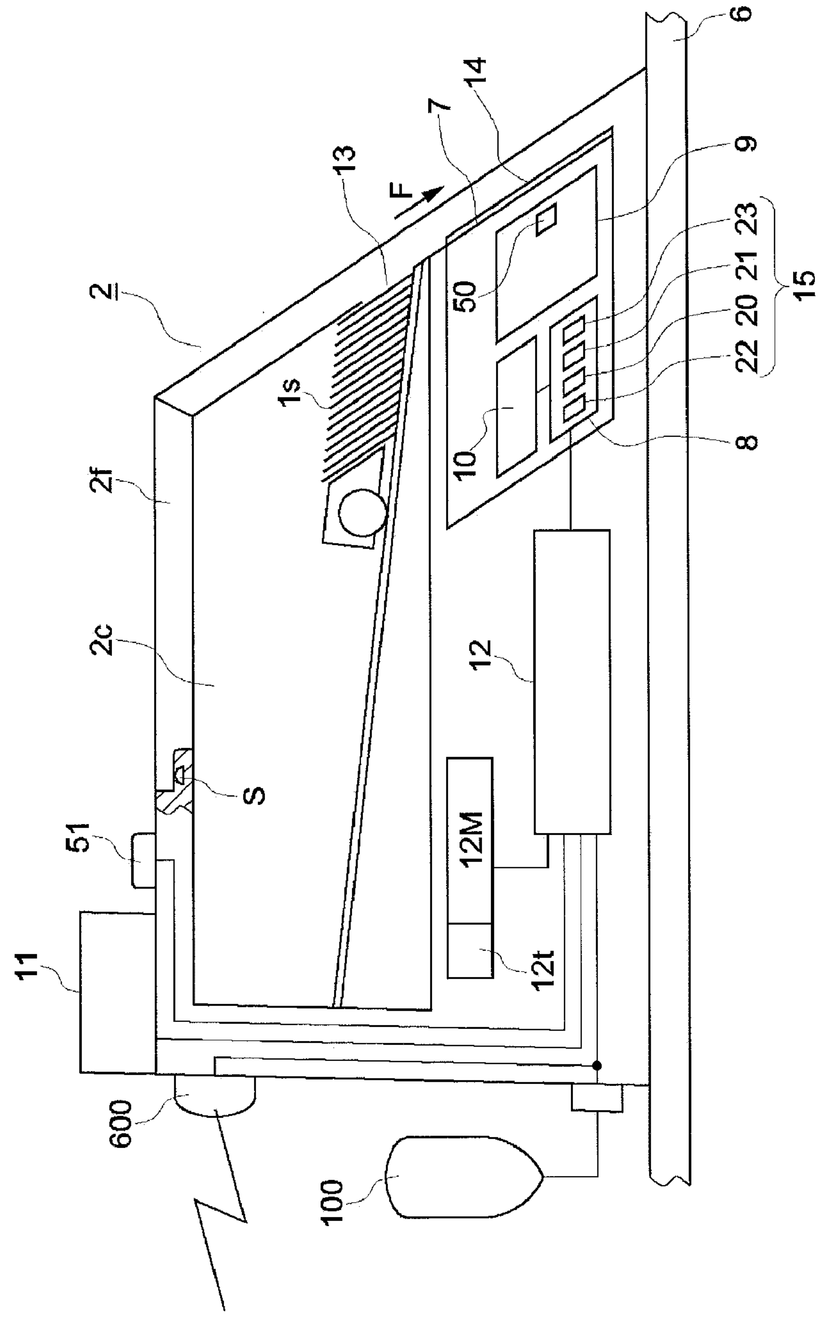
FIG. 3 is a diagram showing a general configuration of the card shoe apparatus.

In FIG. 3, the card shoe apparatus 2 of the table game system of the present embodiment is provided with a lid 2*f* that enables the insertion and removal of the shuffled playing card set 1*s*. A sensor S for detecting the opening/closing of the lid 2*f* is provided under the lid 2*f*, and which detects the opening/closing of the lid 2*f*, thereby detecting the replacement of the shuffled playing card set 1*s*. The card shoe apparatus 2 has a card guide unit 7 that guides cards 1 that are manually drawn one by one from a card housing unit 2C onto a game table, a code reading unit 8 that reads, when a card 1 is manually drawn from the card housing unit 2C by a dealer or the like of a casino, the code C that indicates a figure (number, rank) of that card 1, a winner/loser determination unit 10 that determines the winner/loser of the card game based on the numbers (ranks) of the cards 1 sequentially read by the code reading unit 8, and an output means 11 that outputs the result of the determination made by the winner/loser determination unit 10.

FIG. 4A shows the cards 1 that form the shuffled playing card set 1*s*. A figure (number, rank) is encoded and printed on each card 1 that is used in a table game such as baccarat as marks M in UV ink or the like, which is invisible under normal conditions. Codes C, each of which is configured with marks M, are provided in the upper and lower sides of the card 1 in a point-symmetric manner. The cut card 1*c* shown in FIG. 4B has also code C, each of which is configured with mark(s) M to be identified that it is the cut card itself). Preferably, the code C is printed in a position where it does not overlap with the indications of the card types 101 or indexes 102 with a paint material that becomes visible when irradiated with a UV ray.

Figure 5:
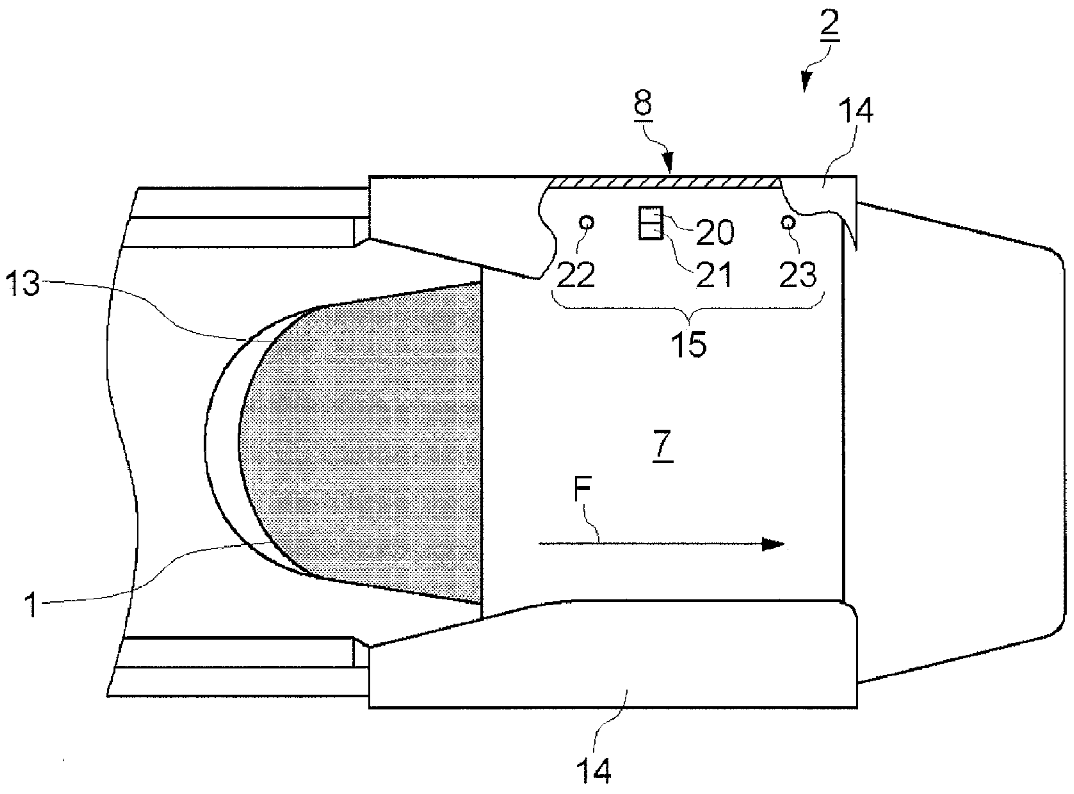
FIG. 5 is an enlarged plan view showing a main portion of a card guide of the card shoe apparatus, in which the card guide is partially broken.

Next, the code reading unit 8, which reads from a card 1 the code C that indicates the figure (number, rank) of the card 1 when the card 1 is manually drawn from the card housing unit 2C, will be described in detail with reference to FIG. 5. FIG. 5 is a plan view of a main portion of the card shoe apparatus 2. In FIG. 5, the code reading unit 8 is provided in the card guide unit 7 that guides the cards 1 manually drawn one by one from an opening 13 of the card housing unit 2C onto the game table, with the opening 13 provided in a front portion of the card housing unit 2C. The card guide unit 7 is an inclined surface, and a card guide cover 14 is attached to a portion of the edge of each of both sides thereof, with the card guide cover 14 also serving as a sensor cover. Also, each of the two card guide covers 14 is configured to be attachable/detachable with screws or the like (not shown). When a card guide cover 14 is removed, a sensor group 15 of the code reading portion 8 is exposed. The sensor group 15 is composed of four sensors, including two ultraviolet reactive sensors (UV sensors) 20 and 21, and object detection sensors 22 and 23.

The object detection sensors 22 and 23 are optical fiber sensors that each can detect the presence of a card 1 and movement thereof. The object detection sensor 22 is placed in the upstream side of the card guide unit 7 in the direction of the flow (arrow F) of the card 1, and the object detection sensor 23 is placed in the downstream side of the card guide unit 7 in the direction of the flow of the card 1. As shown in FIG. 5, the object detection sensors 22 and 23 are provided in the upstream and downstream sides of the UV sensors 20 and 21, respectively. Each of the UV sensors 20 and 21 includes an LED (UV LED) that emits an ultraviolet ray and a detector. The marks M are printed on the card 1 in UV luminescent ink that emits color when UV ray is applied. The card 1 is irradiated with the UV ray (black light), and the detector detects the light reflected by the marks M of the code C of the card 1. The UV sensors 20 and 21 are connected to a control unit 12 of the code reading unit 8 via a cable. In the code reading unit 8, the arrangement patterns of the marks M are determined based on the output signals of the detectors of the UV sensors 20 and 21, and the number (rank) corresponding to the code C is also determined.

The cut card 1*c* has also code C and is determined to be the cut card by the code reading unit 8.

In the code reading unit 8, the start and end of the reading performed by the UV sensors 20 and 21 are controlled by the control unit 12 based on the detection signals from the object detection sensors 22 and 23. Also, the control unit 12 determines whether a card 1 has properly passed through the card guide unit 7 based on the detection signals from the object detection sensors 22 and 23. As shown in FIG. 4A, the rectangular marks M are arranged within a framework of two rows with four columns on each of the upper and bottom edges of the card 1, and the arrangement of such marks M indicates the rank (number) and the suit (Heart, Spade or the like) of the card 1. If the UV sensor(s) 20 and/or 21 detect(s) a mark M, such UV sensor(s) will give out an on signal. The code reading unit 8 determines the relative relation between the signals received from the two UV sensors 20 and 21. This enables the code reading unit 8 to identify the code based on the relative difference or the like between the two marks M detected by the two UV sensors 20 and 21, thereby identifying the number (rank) and the type (suit) of the corresponding card 1and the cut card 1*c* as well.

Figure 6:
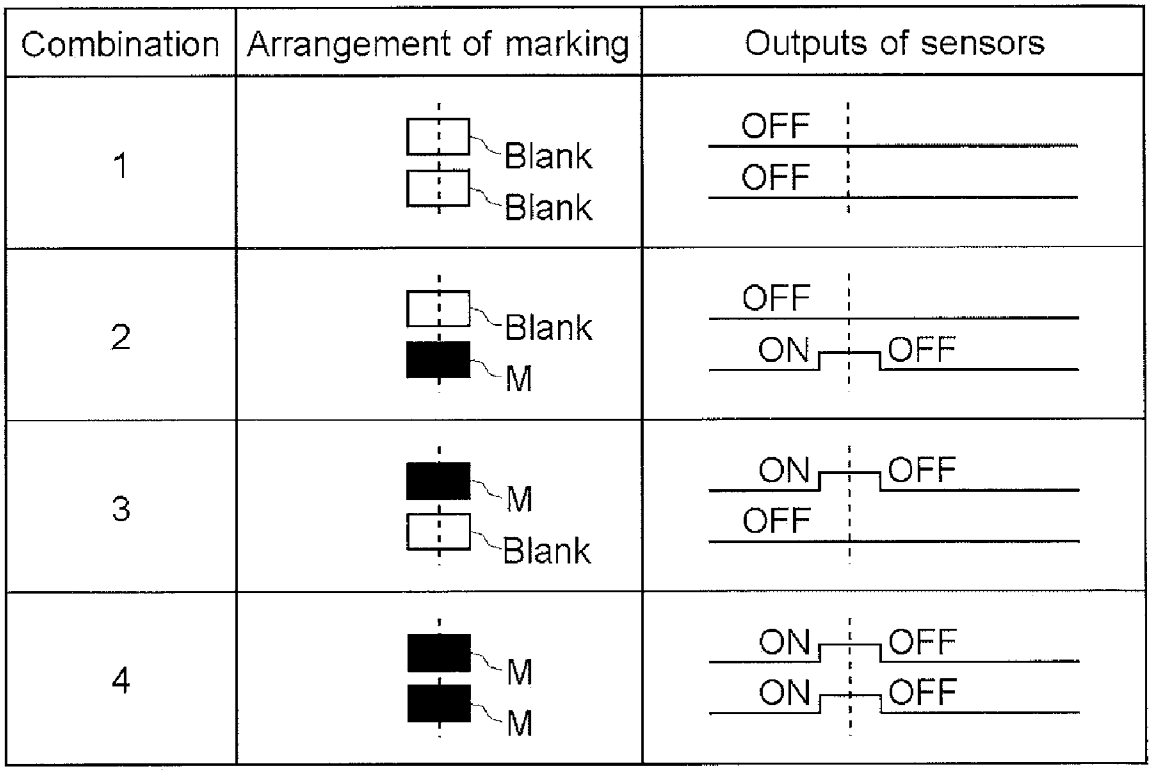
FIG. 6 is a diagram showing the relation between the output waves from sensors and marks in the card shoe apparatus.

The relation between the code C and the output of the on signals of the two UV sensors 20 and 21 are shown in FIG. 6. It is possible to identify a predetermined arrangement pattern of the marks M based on a comparison of the results of the relative changes in the output of the on signals of the UV sensors 20 and 21. As a result, in two rows (the upper and lower rows), four types of arrangement patterns of the mark M are possible, and since patterns are printed in four columns, it is possible to form 256 types of codes (4×4×4×4). Fifty two (52) different playing cards are each assigned to one of the 256 codes, and the associations of such assignments are stored in a memory or by a program as an association table. The card reading unit 8 can, by identifying the code C, identify the number (rank) and the type (suit) of the card 1 based on that predetermined association table (not shown). Also, 52 cards can be freely associated with 52 codes out of the 256 codes to be stored in the association table, and thus, there will be a variety of associations between them. Therefore, it is possible to change the associations among the 256 codes C and the suits and ranks of the 52 cards depending on the time or place. Preferably, the code C is printed in a position where it does not overlap with the indications of the card types or indexes with a paint material that becomes visible when irradiated with a UV ray.

Next, the control unit 12 will be described in further detail. The control unit 12 is achieved by a computer apparatus, and includes the winner/loser determination unit 10 that automatically determines the winner/loser of a game, and the like. This process function (in the control unit 12) is achieved by installing in a computer a program for determining the winner/loser, which is executed by a computer processor. Also, the control unit 12 reads from the barcode 3 read by the barcode reader 100 or the input means 200 or RFID reading device 300, the shuffled card ID, which uniquely identifies the shuffled playing card set 1*s*, and stores the shuffled card ID in a reading memory 12M.

The control unit 12 has further a function of identifying an exposition of the cut card by the card reading unit 8 and memorizing this information as that the shuffled playing card set 1*s* now being used is will be or have changed to the new one. The information of the exposition of the cut card is at least used for identifying an end of the current game using the shuffled playing cards set 1*s* currently set in the card shoe apparatus 2. The control unit 12 has also a function of identifying specified events that occur during the use of the set of the shuffled playing cards is at a game table during the two ex-positions of the cut cards that is to say the shuffled playing card set 1*s* is being used and has changed to the new one at the event of identifying an exposition of the cut card 1*c*. The control unit 12 has a function of memorizing these the memory 12M and reporting these occurrences of the specified event to a database and main computer 400 in an administration section of the casino.

The specified events include at least one of the following: (1) a reading error in the card reading unit of a card, (2) an attempt to draw a card when no card should be drawn according to the rules of the card game, (3) the winner/loser of each card game during the use of the shuffled playing cards currently set in the card shoe apparatus, and (4) an improper shuffling of a set of shuffled playing cards set in the card shoe apparatus comprising the relative arrangement of predetermined number of cards.

The information of the exposition of the cut card 1*c* and/or a new shuffled card ID reported by the control unit 12 to a database and main computer 400, and the occurrences of the specified event to a database 400 will be used for administrating at least one of the followings: (1) an average time for one game during the use of the shuffled playing cards currently set in the card shoe apparatus 2, (2) an average error occurrences during the use of the shuffled playing cards set 1*s* currently set in the card shoe apparatus 2, (3) monitoring of tendencies of the results of games during the use of the shuffled playing cards set 1*s*, and (4) the restart or reset of a monitor 500 for displaying results of games during each use of playing cards set 1*s* currently set in the card shoe apparatus 2. The displaying of the results by the monitor 500 is reset every end of the use of playing cards set is in casino as usual.

When it comes to identifying the shuffled card ID the control unit 12 identifies and stores the uniquely identifiable shuffled card ID, then the control unit 12 identifies that this ID is the ID of the shuffled playing card set 1*s* that is currently being used in the game and the current time, and stores them in connection with the shuffled card ID. The control unit 12 identify each of the following specified events that occur while the shuffled playing card set 1*s* identified by the shuffle card ID is being used at the game table to be stored in the memory 12M in connection with the time of occurrence thereof. Also, the ordinal number of the card subject of the occurrence of the relevant event within the shuffled playing card set is currently set in the card shoe apparatus, or the ordinal number of the game subject of the occurrence of the relevant event among the individual games played with such shuffled playing cards (the winner (the player or the banker) is determined for each individual game, and after betting chips are settled, the next individual game starts) is stored.

The items of specified events to be stored the memory 12M in connection with the shuffled card ID include at least one of the following: (1) a reading error in the cord reading unit 8 of a card in the identified shuffled playing card set; (2) an end of a game due to an operation of an end button 53 to end the use of the shuffled playing card set 1*s* currently set in the card shoe apparatus 2, or the drawing of the cut card 1*c* from the shuffled playing card set is currently set in the card shoe apparatus 2; (3) an attempt to draw a card when no card should be drawn according to the rules of the card game; (4) an attempt to move or insert a card in a direction opposite to a drawing direction of the opening 13; and (5) an occurrence of a preset irregular operation to be determined to be irregular by the card shoe apparatus 2.

Note that the reading error in item (1) above refers to a failure by the cord reading unit 8 that reads two marks M of the card 1 to identify the card based on the association table due to the code that is read not being a predetermined code, or a failure to identify the number (rank) and the type (suit) of the card 1 that correspond to the code read. With respect to item (2) above, the end button 53 is pressed to end the use of the shuffled playing card set 1*s* currently set in the card shoe apparatus 2. Upon this action, the end of a game is registered in the card shoe apparatus 2. Also, if the cut card 1*c* is drawn from the shuffled playing card set 1*s* currently housed in the card shoe apparatus 2, the game ends at the next game or after a few games, and the remaining cards of the shuffled playing card set 1*s* will not be used anymore. An attempt to draw any card when no card should be drawn according to the rules of the card game as described in item (3) above will be described later. Any attempt to insert any card in the opposite direction at the opening 13 as described in item (4) above refers to a case where the object detection sensors 22 and 23 detect a fraudulent act such as the insertion of any card in the direction opposite to the direction of the movement of a card 1 (arrow F) under the relevant conditions, and assumes a case where the object detection sensors 22 and 23 detect movement of a card 1 in the direction opposite to the arrow F. Any preset irregular situation that will be determined by the card shoe apparatus 2 as irregular as described in item (5) above refers to, for example, a situation where the card 1 stays above the object detection sensors 22 and 23 for a period longer than the predetermined period, and such irregular situation has been input and stored in advance in the memory 12M as a program.

The memory 12M stores the occurrence of any security item in connection with the relevant shuffled card ID read by the barcode 3, and when it stores a security item, it stores the time of occurrence of that security item as well. For this purpose, the memory 12M includes a clock 12*t*. It also includes an external transmission apparatus 300 for externally transmitting the occurrence of a security item with the shuffled card ID. Notice of the occurrence of a security item and the time of its occurrence is given to the management division or the pit of the casino via the external transmission apparatus 300 in connection with the relevant shuffled card ID. The management division of the casino stores and registers such transmitted items in connection with the relevant shuffled card IDs in a database 400. The dealer or the like is also informed about the occurrence of a security item by the display made by lamps 51 and a liquid crystal display unit 52.

Next, a variation in which an input means 200 is provided instead of the barcode reader 100 that is capable of identifying the shuffled card ID will be described. Instead of reading the barcode 3 with the barcode reader 100 to identify the shuffled card ID of the card set currently being used, a configuration is possible in which a barcode reader is provided in a separate device installed on the game table (for example, an apparatus for the disposal of a card 1 or a device that confirms the card 1 disposed), and the shuffled card ID [of the card set] to be used is obtained by such a barcode reader, and the shuffled card ID is input to the card shoe apparatus 2 through communication 201 or another computer with such a device. In this case, the separate device with the barcode reader serves as an input apparatus capable of identifying the shuffled card ID.

Figure 8A:
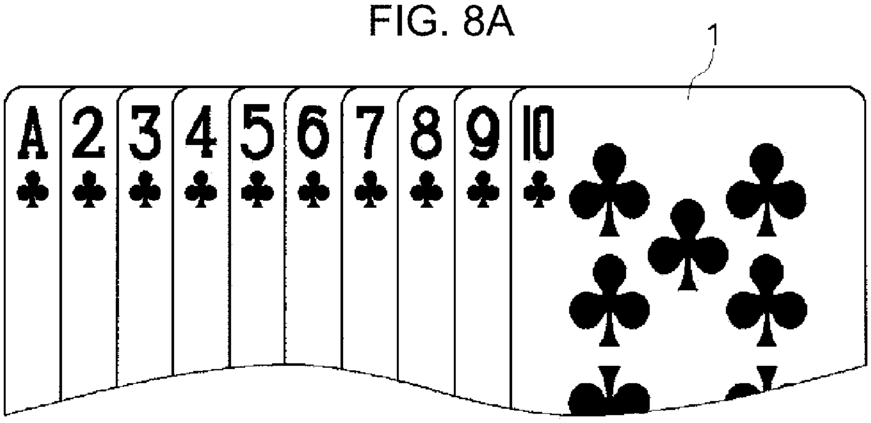
FIGS. 8A-B show cards that have been improperly shuffled according to exemplary embodiments of the present invention.
Figure 8B:
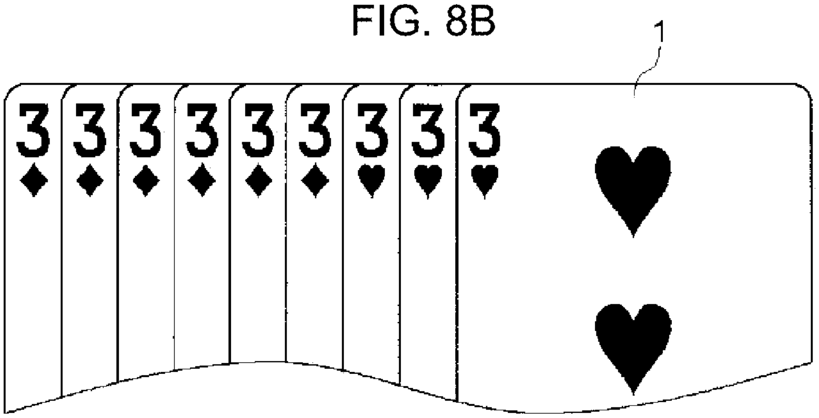

According to an exemplary embodiment of the present invention, the card shoe apparatus 2 may detect an irregularity in the manner in which the cards are shuffled and in some cases generate an alert based on the detected irregularity. In this regard, the information collected by the card reading unit 8 as the cards are drawn from the card shoe apparatus 2 may be used to determine whether the cards have been shuffled improperly. An irregularity in the arrangement order of the cards will be described with reference to FIGS. 8A-B. FIG. 8A shows an example where the cards 1 drawn from the card housing unit have the same suit (Clubs) with sequential figures (number, rank) beginning from Ace. FIG. 8B shows an example where the cards 1 drawn from the card housing unit 2*c* consist of 9 cards with the same rank (3). Generally, the cards 1 are shuffled by a random number generator or the like so as to be arranged in a random order. The arrangement of the cards 301 shown in FIGS. 8A-B is substantially non-random, thus indicating an irregular shuffling of the playing cards 1. Other examples of card arrangements which may indicate a shuffling irregularity include: (a) a case in which a predetermined number of cards within a set of cards exhibit a pattern in which the rank of a card is larger (or smaller) by one as compared to compared to the rank of the preceding card (for example, 1, 2, 3, 4, . . . , K) (as shown in FIG. 8A); (b) a case where a predetermined number of cards in sequence have the same rank (for example, A, A, A, A, . . . ) (as shown in FIG. 8B); (c) a case where the same sequence is repeated throughout a predetermined number of cards (for example, A, Q, 10, A, Q, 10, . . . ); (d) a case where a predetermined number of cards in sequence have the same suit (for example, 13 consecutive cards with Hearts); (e) a case in which a predetermined number of cards in each of two or more sets of cards have the same sequence of suit and rank (A, 5, Q, J, 2, 8, 9, K, . . . ). In particular, for each card game, a different set of cards may be housed in the card shoe apparatus 2. A shuffling irregularity may be detected if a predetermined number of cards in a later-used set match the same predetermined number of cards in an earlier-used set in terms of suit and/or rank sequence; and (f) a case where the order of a predetermined number of cards matches an order registered in advance (for example, where the order of the cards matches the order of cards used in a separate card manufacturing process). Irregular shuffling patterns (such as examples (a)-(d)) as well as the sequence of suit and rank (e.g., A, 5, Q, J, 2, 8, 9, K, . . . ) of card sets previously housed in the card shoe apparatus 304 may be stored in the memory 12M, and the control unit 12 may use this stored information to determine whether irregular shuffling has occurred. For example, irregular shuffling may be determined if the order of a predetermined number of cards 1 within a set matches at least a portion of the stored patterns. In another example, irregular shuffling may be determined if a number of card sets each used in one of a predetermined number of games include a predetermined number of cards that match the stored patterns.

As another example, a shuffling irregularity may be determined when each deck of cards within a set of cards is detected to be shuffled in the same or substantially similar way. For example, a shuffling irregularity may be detected when, for a plurality of cards, the suit and rank of each card drawn are the same as those of the card preceding it by 52 cards. In such a case, shuffling of a plurality of decks has failed for some reason, and instead each of the 52 cards is arranged in the same order.

In general, a shuffling irregularity may be detected when a stored pattern continues throughout a predetermined number of cards. In this regard, a preliminary alarm of irregularity may be generated at some point prior to the stored pattern being detected in all of the predetermined number of cards. For example, a preliminary alarm may be generated upon the drawing of a card that is several cards before the end of a predetermined number of cards. The preliminary alarm may be in a form different from the final alarm, for example, by characters, in a certain color, or with a different lamp. In an exemplary embodiment, if a state does not continue to be irregular throughout a predetermined number of cards and returns to a random state, then the preliminary alarm may be cancelled.

For each shuffled card ID of the shuffled playing card set 1*s*, when an event falling under any of the specified events (security items) occurs thereto, the management division or the pit of the casino is informed via an external transmission apparatus 600 of the fact and the time of said occurrence in connection with the relevant shuffled card ID, and such information is forwarded to the database 400 and stored therein. Furthermore, the dealer or the like is informed of the occurrence of a security item by the display made by the lamps 51 and the liquid crystal display unit 52. Such transmitted items are registered in the database 400 of the management division of the casino so that an item that falls under at least one of the following is registered in connection with the shuffled card ID identified with respect to the card set currently used in the game, thereby providing overall control of the operations of the casino or an efficient operation thereof.

For the overall control of the operations of the casino or the efficient operation thereof, the management division of the casino register in the database and use, for example, the data items described as follows: (1) the game table used; (2) the dealer (person who draws the cards) in charge of the game table used; (3) the start time of the use of the identified shuffled playing card set; (4) the end time of the use of the identified shuffled playing card set; (5) the time period when the card(s) of the identified shuffled playing card set were present on the game table; (6) information concerning the pit or the card room where the identified shuffled playing card set is managed before it is delivered to the relevant game table; (7) information concerning the process of disposal of the identified shuffled playing card set after its use at the game table; (8) information on whether all of the cards of the identified shuffled playing card set have reached the disposal apparatus; (9) information concerning the pit or the card room where the shuffled playing card set identified in advance is managed before it is delivered to the relevant game table; (10) information concerning the win and the lose at the game table where the identified shuffled playing card set is used; (11) the time period after the end of the game played using the identified shuffled playing card set and until the start of the next game with the new shuffled playing card set; (12) the time period from the start to the end of the game played using the identified shuffled playing card set; (13) information on the purchase or procurement of the identified shuffled playing card set; (14) an average time for one game during the use of the shuffled playing cards currently set in the card shoe apparatus 2; (15) an average error occurrences during the use of the shuffled playing cards set 1*s* currently set in the card shoe apparatus; (16) monitoring of tendencies of the results of games during the use of the shuffled playing cards set 1*s*; and (17) the restart or reset of a monitor 500 for displaying results of games during each use of playing cards set 1*s* currently set in the card shoe apparatus 2. The displaying of the results by the monitor 500 is reset every end of the use of playing cards set is in casino as usual.

An embodiment of the present invention has been described above, the scope of the present invention also covers the following annexes.

Annex 1: A table game system comprising: shuffled playing cards composed of playing cards made up of a plurality of number of decks shuffled to have a unique arrangement order and a cut card, a uniquely identifiable shuffled card ID being attached to the shuffled playing cards and/or the cut card as an ID code; and a card shoe apparatus that includes ID code identifying means and/or an input means capable of identifying the shuffled card ID, and houses the shuffled playing cards and the cut card, the card shoe apparatus comprising: a card housing unit for housing the shuffled playing cards; an opening for drawing cards from the card housing unit one by one; a card reading unit that reads from a card and the cut card information contained in the said card; a control unit that stores rules of a card game and includes a winner/loser determination unit that determines the winner/loser of the card game based on the information on the ranks of the cards read by the card reading unit; and a display unit that outputs a result of the winner/loser determined by the winner/loser determination unit, the control unit has a function of identifying specified events that occur during the use of set of the shuffled playing cards at a game table, and of reporting these occurrences of the specified event, and the control unit has further a function of identifying an exposition of the cut card and of sending information of the exposition of the cut card, the information of the exposition of the cut card is at least used for identifying an end of the current game using the shuffled playing cards currently set in the card shoe apparatus, and the specified events include at least one of the following: (1) a reading error in the card reading unit of a card, (2) an attempt to draw a card when no card should be drawn according to the rules of the card game; (3) the winner/loser of each card game during the use of the shuffled playing cards currently set in the card shoe apparatus, and, (4) an improper shuffling of a set of shuffled playing cards set in the card shoe apparatus comprising the relative arrangement of predetermined number of cards; and wherein the information of the exposition of the cut card is used for administrating at least one of the followings; (1) an average time for one game during the use of the shuffled playing cards currently set in the card shoe apparatus, (2) an average error occurrences during the use of the shuffled playing cards currently set in the card shoe apparatus, (3) monitoring of tendencies of the results of games during the use of the shuffled playing cards, and (4) restart or reset of a monitor for displaying results of games during the use of playing cards currently set in the card shoe apparatus.

Annex 2: Table game system according to annex 1, wherein at least one of the following items is stored and forwarded to a database in connection with the shuffled card ID identified in relation to the card set in the card shoe apparatus: (1) the game table used; (2) the dealer (person who draws cards) in charge of the game table used; (3) the start time of the use of the identified shuffled playing cards; (4) the end time of the use of the identified shuffled playing cards; (5) the time period when the identified shuffled playing cards were present on the game table; (6) information concerning the pit or the card room where the identified shuffled playing cards are managed before it is delivered to the relevant game table; (7) information concerning the pit or the card room where the shuffled playing cards identified in advance is managed before it is delivered to the relevant game table; (8) the time period after the end of the game played using the identified shuffled playing cards and until the start of the next game with the new shuffled playing cards; (9) the time period from the start to the end of the game played using the identified shuffled playing cards; and (10) information on the purchase or procurement of the identified shuffled playing cards.

Annex 3: A table game system according to annex 1 or 2, wherein the input means of information capable of identifying the shuffled card ID is configured to obtain shuffled card ID by a communication means or, wherein the improper shuffling for determining relative arrangement comprises determining at least one of rank or suit of each of the predetermined number of cards drawn in sequence from the card shoe apparatus card shoe apparatus.

Annex 4: A table game system according to annexes 1 to 3, wherein the improper shuffling for determining relative arrangement comprising whether the ranks of cards increase or decrease in order, and/or wherein the improper shuffling for determining relative arrangement comprising whether each of the predetermined number of cards have the same rank and or wherein the improper shuffling for determining relative arrangement comprising whether each of the predetermined number of cards are of the same suit and/or wherein the improper shuffling for determining relative arrangement comprising whether a repeating sequence of rank or suit is present within the predetermined number of cards and/or wherein the improper shuffling for determining relative arrangement comprising whether the determined relative arrangement matches a pre-stored relative arrangement.

REFERENCE SIGNS

1, card; 1*s*, shuffled playing card set; 2, card shoe apparatus; 2C, card housing unit; 3, barcode; 8, code reading unit; 10, winner/loser determination unit; 12, control unit; 13 opening.

What is claimed:

1. A system for use with a plurality of sets of decks of playing cards, each of the sets being shuffled in a unique order and having a cut card, the system comprising:

a card shoe apparatus including:

a card housing unit configured to house respective ones of the sets of shuffled playing cards and the cut card, wherein which of the sets is housed in the card housing unit is changed over time;

an opening configured to enable a drawing of the cards from the card housing unit one by one; and a card reading unit configured to read a card drawn from the card housing unit to obtain information from each of the cards;

a display unit configured to display a result of a card game; and a control unit comprising at least one processor configured to, for each of the sets housed in the card housing unit:

identify, based on a result of the reading by the card reading unit, drawings of the cut card to determine a respective period during which the respective one of the sets is used with the card shoe apparatus until the respective set is replaced by another of the sets; and determine and output a relationship between (a) a number of all of a plurality of instances of the card game played using the respective set housed in the card housing unit of the card shoe apparatus, and (b) a time period during which the plurality of instances of the card game were played.

2. The system of claim 1, further comprising:

a database communicably connected to the control unit, wherein the control unit is configured to transmit to the database for storing at least one of the following items of information:

an identification of a game table used for gaming;

an identification of a dealer present at a game table;

a start time of the respectively determined period during which the respective set is used with the card shoe apparatus;

an end time of the respectively determined period during which the respective set is used with the card shoe apparatus;

the respectively determined period during which the respective set is used with the card shoe apparatus;

a pit or a card room where the respective set was stored before being delivered to a game table;

a time period after an end of game play using a first one of the sets until a start of a new game using another one of the sets;

a time period from a start to an end of a game played; and a purchase or procurement of the respective set.

3. The system of claim 1, wherein:

the control unit is configured to identify one or more specified events that occur during use of the shuffled playing cards respective set; and the specified events include at least one of the following:

a reading error in the card reading unit;

a drawing error when a card is attempted to be withdrawn from the card shoe apparatus when no card should be drawn according to rules of a card game;

a determination of a winner/loser of each card game during the use of the shuffled playing cards for that game; and an improper shuffling of playing cards housed in the card shoe apparatus.

4. The system of claim 3, wherein occurrence information of the one or more specified events is transmitted to a main computer.

5. The system of claim 1, wherein the respective set and/or the cut card have a respective uniquely identifiable card ID as an ID code that is associated with the respective set, and the card shoe apparatus identifies the ID code.

6. The system of claim 5, wherein the control unit is configured to perform, based on the determined respective period during which the respective set is used with the card shoe apparatus, at least one of the following:

determine a respective average number of error occurrences during the respective period during which the respective set is used with the card shoe apparatus; and monitor one or more respective tendencies of a plurality of results of a plurality of card games during the respective period during which the respective set is used with the card shoe apparatus.

7. The system of claim 5, further comprising:

a database communicably connected to the control unit, wherein the control unit is configured to transmit to the database for storing at least one of the following items of information in association with the ID code of the respective set:

an identification of a game table used for gaming using the respective set;

an identification of a dealer present at a game table using the respective set;

a start time of use of the respective set;

an end time of the use of the respective set;

the determined respective period during which for the respective set is used with the card shoe apparatus;

a pit or a card room where the respective set was stored before being delivered to a game table;

a time period after an end of game play using the respective set until a start of a new game using another of the sets;

a time period from a start to an end of a game played using the respective set; and a purchase or procurement of the respective set.

8. The system of claim 5, further comprising:

a transmission apparatus configured to externally transmit occurrence information of one or more specified events with the ID code, wherein the one or more specified events include at least one of the following:

a reading error in the card reading unit;

a drawing error when a card is attempted to be withdrawn from the card shoe apparatus when no card should be drawn according to rules of a card game;

a determination of a winner/loser of each card game during the use of the respective set for that game; and an improper shuffling of the respective set.

9. The system of claim 5, wherein the ID code is obtained by a communication means.

10. A method of controlling a system for use with a plurality of sets of decks of playing cards, each of the sets being shuffled in a unique order and having a cut card, the method comprising:

controlling, by a control unit comprising at least one processor, a card shoe apparatus, wherein:

the card shoe apparatus includes:

a card housing unit configured to house respective ones of the sets of shuffled playing cards and the cut card, wherein there is a change over time with respect to which of the sets is housed in the card housing unit;

an opening configured to enable a drawing of the cards from the card housing unit one by one; and a card reading unit configured to read card information from each of the cards; and the controlling comprises:

identifying, based on information from the card reading unit, drawings of the cut card to determine a respective period during which the respective one of the sets is used with the card shoe apparatus until the respective set is replaced by another of the sets; and determining and outputting a relationship between (a) a number of all of a plurality of instances of a card game played using the respective set housed in the card housing unit, and (b) a time period during which the plurality of instances of the card game were played.

* * * * *